United States Patent
West

(10) Patent No.: US 10,583,930 B2
(45) Date of Patent: Mar. 10, 2020

(54) AIRCRAFT ENGINE ATTACHMENT ASSEMBLY

(71) Applicant: SPIRIT AEROSYSTEMS, INC., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 329 days.

(21) Appl. No.: 15/612,220

(22) Filed: Jun. 2, 2017

(65) Prior Publication Data

US 2018/0346137 A1 Dec. 6, 2018

(51) Int. Cl.
*B64D 27/26* (2006.01)
*B64C 3/32* (2006.01)

(52) U.S. Cl.
CPC .............. *B64D 27/26* (2013.01); *B64C 3/32* (2013.01); *B64D 2027/264* (2013.01); *B64D 2027/266* (2013.01)

(58) Field of Classification Search
CPC ........ B64D 27/06; B64D 27/12; B64D 27/18; B64D 2027/262; B64D 2027/264; B64D 2027/266; B64D 2027/268
See application file for complete search history.

(56) References Cited

U.S. PATENT DOCUMENTS

| 2005/0082423 | A1* | 4/2005 | Whitmer | B64D 27/18 244/54 |
| 2005/0178888 | A1* | 8/2005 | Machado | B64D 27/12 244/54 |
| 2005/0274485 | A1* | 12/2005 | Huggins | B22C 9/22 164/349 |
| 2010/0090056 | A1* | 4/2010 | Gardes | B64D 27/26 244/54 |
| 2011/0036942 | A1* | 2/2011 | Marche | B64D 27/26 244/54 |
| 2011/0127371 | A1* | 6/2011 | Takeuchi | B64D 27/18 244/54 |
| 2015/0251768 | A1* | 9/2015 | Woolley | B64D 27/26 244/54 |
| 2016/0244174 | A1* | 8/2016 | Pautis | B64D 27/18 |

* cited by examiner

*Primary Examiner* — Philip J Bonzell
*Assistant Examiner* — Tye William Abell
(74) *Attorney, Agent, or Firm* — Hovey Williams LLP

(57) ABSTRACT

An aircraft engine attachment assembly having a wing section, an engine pylon, upper secondary attachment links, lateral load attachment links, and a number of fuse pins. The engine pylon is mounted to the front end of the wing section so that the engine pylon is not restricted by a minimum structural depth. The wing section, engine pylon, upper secondary attachment links, and lateral load links form primary and secondary attachment joints configured to form alternate load paths if one of the joints fails. The wing section and engine pylon include knuckle-off geometries for promoting mechanical fusing of the fuse pins during high energy dynamic events.

19 Claims, 10 Drawing Sheets

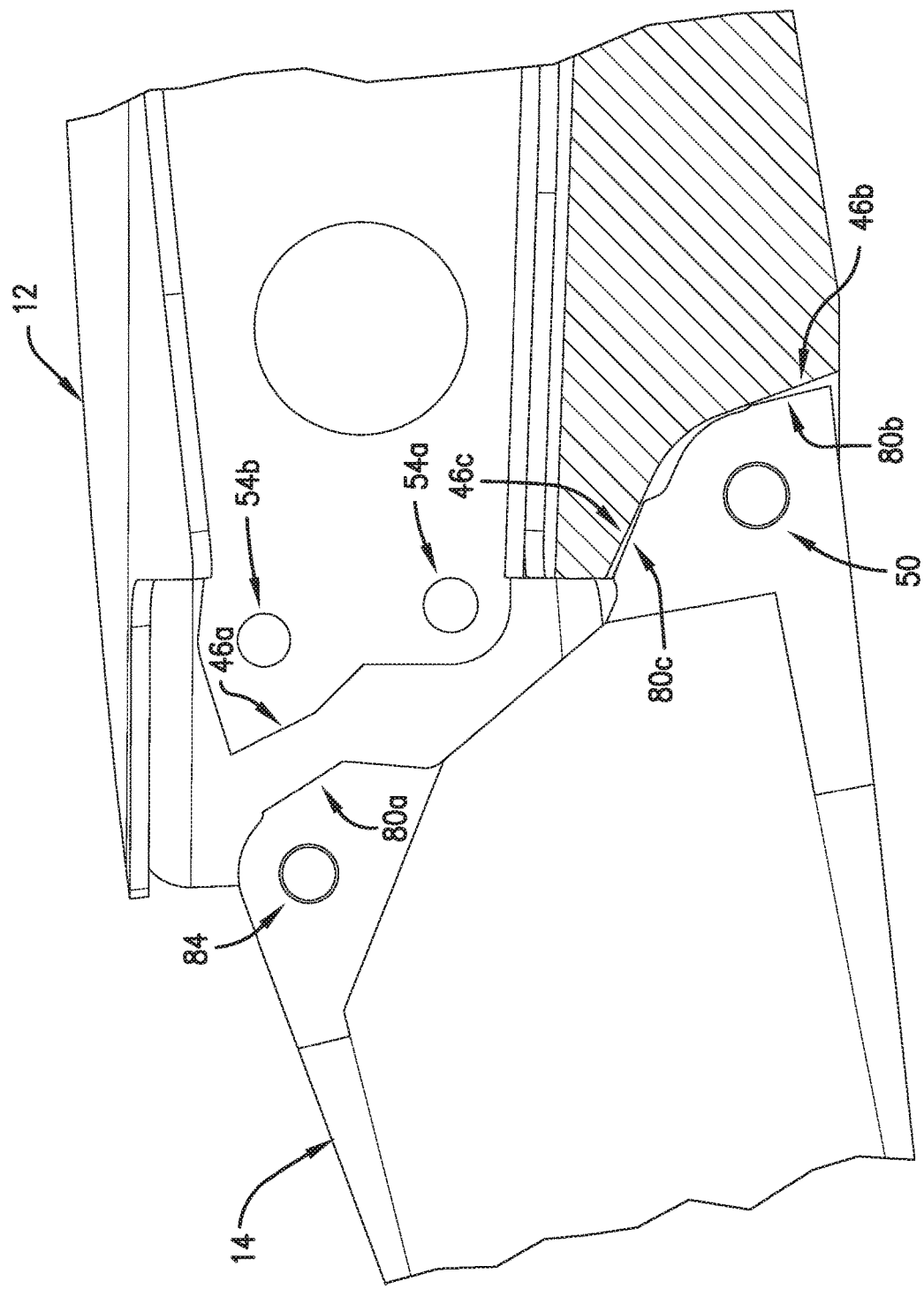

AIRCRAFT ENGINE ATTACHMENT ASSEMBLY

BACKGROUND

Aircraft engines are often mounted to the underside of aircraft wings where engine size is limited by engine ground clearance requirements and wing height. One solution is to position the engines forward from the wings via elongated engine pylons to increase ground clearance. Unfortunately, the height at which forward-mounted engines can be positioned is limited by a minimum structural depth (i.e., a minimum vertical construction and hence vertical strength) required for engine pylons of conventional aircraft engine attachment assemblies. The performance and behavior of such aircraft engine attachment assemblies during joint failure and high energy dynamic events is also difficult to predict and control, which may lead to fuel tank rupture and damage to other volatile components.

SUMMARY

Embodiments of the present invention provide an aircraft engine attachment assembly that is not restricted by a minimum structural depth and has improved behavior during high energy dynamic events. The aircraft engine attachment assembly includes a wing section, an engine pylon, inboard and outboard secondary attachment links, inboard and outboard lateral load links, a number of connectors, and a number of fuse pins.

The wing section has a forward end to which the engine pylon is attached and lower and upper portions. The wing section includes lower inboard and outboard primary attachment points on the lower portion, upper inboard and outboard secondary attachment points on the upper portion, inboard and outboard lateral load attachment points, and knuckle-off geometries.

The lower inboard and outboard primary attachment points form lower inboard and outboard primary joints with primary attachment points of the engine pylon. The upper inboard secondary attachment points include first and second inboard secondary attachment points spaced generally vertically from each other. The upper outboard secondary attachment points include first and second outboard secondary attachment points spaced generally vertically from each other.

The first and second inboard and outboard secondary attachment points form upper inboard and outboard secondary joints with the inboard and outboard secondary attachment links. The inboard and outboard lateral load attachment points form inboard and outboard lateral load joints with the inboard and outboard lateral load links.

The knuckle-off geometries of the wing section include upper knuckle-off geometry near inboard and outboard secondary attachment points and downside and upside knuckle-off geometries near the primary attachment points. The knuckle-off geometries may generally be on or near the forward end of the wing section and are configured to engage knuckle-off geometries of the engine pylon. The knuckle-off geometries may be sloped downward and aft for urging the engine and engine pylon under the wing section during certain high energy dynamic events.

The engine pylon is a torque box that supports the engine on the wing section and includes lower inboard and outboard primary attachment points on the lower portion of the engine pylon, upper inboard and outboard secondary attachment points on the upper portion of the engine pylon, inboard and outboard lateral load attachment points, and knuckle-off geometries.

The lower inboard and outboard primary attachment points form the lower inboard and outboard primary joints with the lower inboard and outboard primary attachment points of the wing section. The upper inboard and outboard secondary attachment points form upper inboard and outboard secondary joints with the inboard and outboard secondary attachment links. The inboard and outboard lateral load attachment points form inboard and outboard lateral load joints with the inboard and outboard lateral load links.

The knuckle-off geometries of the engine pylon include upper knuckle-off geometry near the upper inboard and outboard secondary attachment points of the engine pylon and downside and upside knuckle-off geometry near the lower inboard and outboard primary attachment points of the engine pylon. The knuckle-off geometries of the engine pylon are configured to engage the knuckle-off geometries of the wing section. The knuckle-off geometries may be sloped downward and aft for urging the engine and engine pylon under the wing section during certain high energy dynamic events.

The inboard secondary attachment links connect the upper portion of the engine pylon to the upper portion of the wing section via the upper inboard secondary joints. The inboard secondary attachment links may be L-shaped and may have filleted edges to increase their strength and reduce high stress concentrations.

The outboard secondary attachment links connect the upper portion of the engine pylon to the upper portion of the wing section via the upper outboard secondary joints. The outboard secondary attachment links may be L-shaped and may have filleted edges to increase their strength and reduce high stress concentrations.

The inboard lateral load link connects the engine pylon to the wing section via inboard lateral load joints and may be oriented diagonally for reacting lateral loads. The inboard lateral load link may have filleted edges to increase its strength and reduce high stress concentrations.

The outboard lateral load link connects the engine pylon to the wing section via outboard lateral load joints. The outboard lateral load link may be oriented diagonally in an opposite direction relative to the inboard lateral load link for reacting lateral loads in an opposite direction than the lateral loads reacted by the inboard lateral load link.

The connectors secure the engine pylon to the wing section at non-fuse-able joints and may be solid high-strength bolts, pins, or other non-shear fasteners. The connectors have a shear strength greater than a shear strength of the fuse pins.

The fuse pins secure the engine pylon to the wing section at fuse-able joints (as described below) and may be hollow, cylindrical pins configured to shear or break under a predetermined load. Alternatively, lugs or lug fittings may be used to form fuse-able or breakaway joints.

In normal intact operation, the engine pylon is supported in both vertical and longitudinal directions at the lower inboard and outboard primary joints and a substantially longitudinal direction with a vertical component at the upper inboard and outboard secondary joints. The engine pylon is normally supported laterally via lateral load joints. However, the aircraft engine attachment assembly forms alternate load paths or damage tolerant load paths through intact joints if any single joint fails.

The aircraft engine attachment assembly may also form redundant or fail-safe load paths. In this case, components may be "doubled" or "back-to-back", in which case each component is configured to carry a load if the other component fails. Use of redundant load paths and joints may impact the effectiveness of the separation mechanism if pin-in-pin fastening was used.

The aircraft engine attachment assembly can safely and predictably separate in one of four scenarios: i) the aircraft has a high vertical descent rate and the engine contacts the ground before the fuselage contacts the ground; ii) the aircraft has a high vertical descent rate and the fuselage contacts the ground before the engine contacts the ground; iii) the fuselage contacts the ground and the engine does not contact the ground until after separation, and iv) the aircraft has a substantially forward vector and the engine contacts a stationary mass on the ground.

In the first scenario, the engine pylon rotates upwards about the lower inboard and outboard primary joints when the engine contacts the ground, which causes fuse pins of the upper inboard and outboard secondary joints to fuse. Then the upper knuckle-off geometries of the wing section and engine pylon engage so as to form a fulcrum point about which the engine pylon begins rotating. This causes fuse pins of the lower inboard and outboard primary joints to fuse, at which point the engine pylon is completely separated from the wing section.

In the second scenario, the engine pylon rotates downwards about the lower inboard and outboard primary joints when the fuselage of the aircraft contacts the ground, which causes fuse pins of the upper inboard and outboard secondary joints to fuse. The engine pylon then rotates upwards about the lower inboard and outboard primary joints when the engine contacts the ground. Then the upper knuckle-off geometries of the wing section and engine pylon engage so as to form a fulcrum point about which the engine pylon begins rotating. This causes fuse pins of the lower inboard and outboard primary joints to fuse, at which point the engine pylon is completely separated from the wing section. The engine and engine pylon may continue forward under momentum and residual thrust.

In the third scenario, the engine pylon rotates downwards about the lower inboard and outboard primary joints when the fuselage of the aircraft contacts the ground, which causes the fuse pins of the upper inboard and outboard secondary joints to fuse. The engine pylon then continues to rotate downwards about the lower inboard and outboard primary joints. Then the downside knuckle-off geometries of the wing section and engine pylon engage so as to form a fulcrum point about which the engine pylon begins rotating. This causes fuse pins of the lower inboard and outboard primary joints to fuse, at which point the engine pylon is completely separated from the wing section. The engine and engine pylon may continue to travel under the wing section after separation.

In the fourth scenario, the engine pylon moves aft when the engine contacts the stationary mass, which causes fuse pins of the lower inboard and outboard primary joints and the upper inboard and outboard secondary joints to fuse. Then the knuckle-off geometries of the wing section and engine pylon engage, which urges the engine pylon under the and away from the wing section.

The above-described aircraft engine attachment assembly provides several advantages. For example, the engine pylon is configured to be mounted at least partially to the upper portion of the wing section, which provides greater ground clearance and hence allows larger engines to be mounted to the wing. The aircraft engine attachment assembly forms alternate load paths if one of its joints fails. The wing section and engine pylon include knuckle-off geometries that promote mechanical fusing of joints during high energy dynamic events. The knuckle-off geometries also reduce impact damage to volatile areas of the aircraft's wing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 6 is a side elevation view of knuckle-off geometry of the aircraft attachment assembly;

Figure 1:
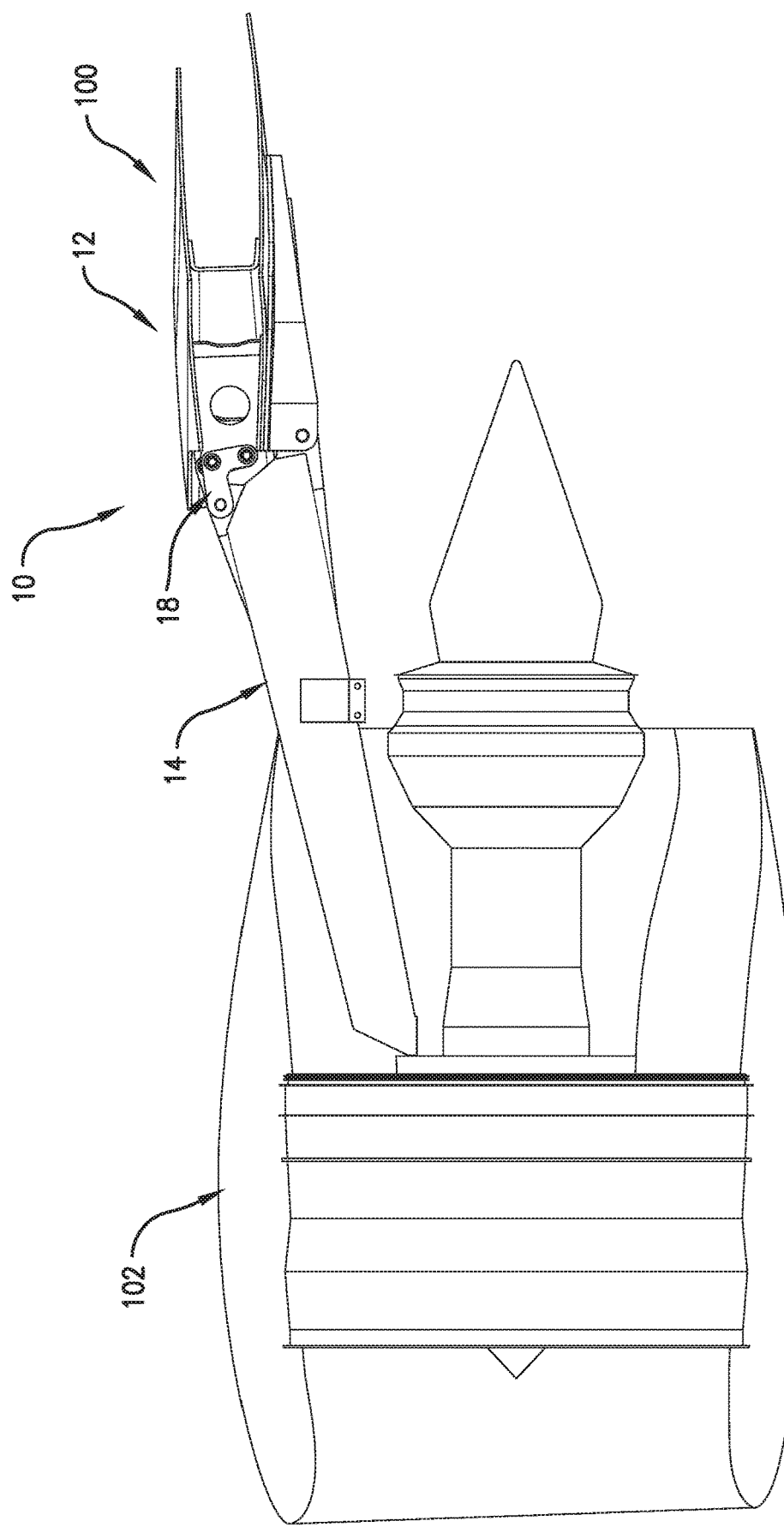
FIG. 1 is a side elevation view of an aircraft engine attachment assembly constructed in accordance with an embodiment of the invention.
Figure 2:
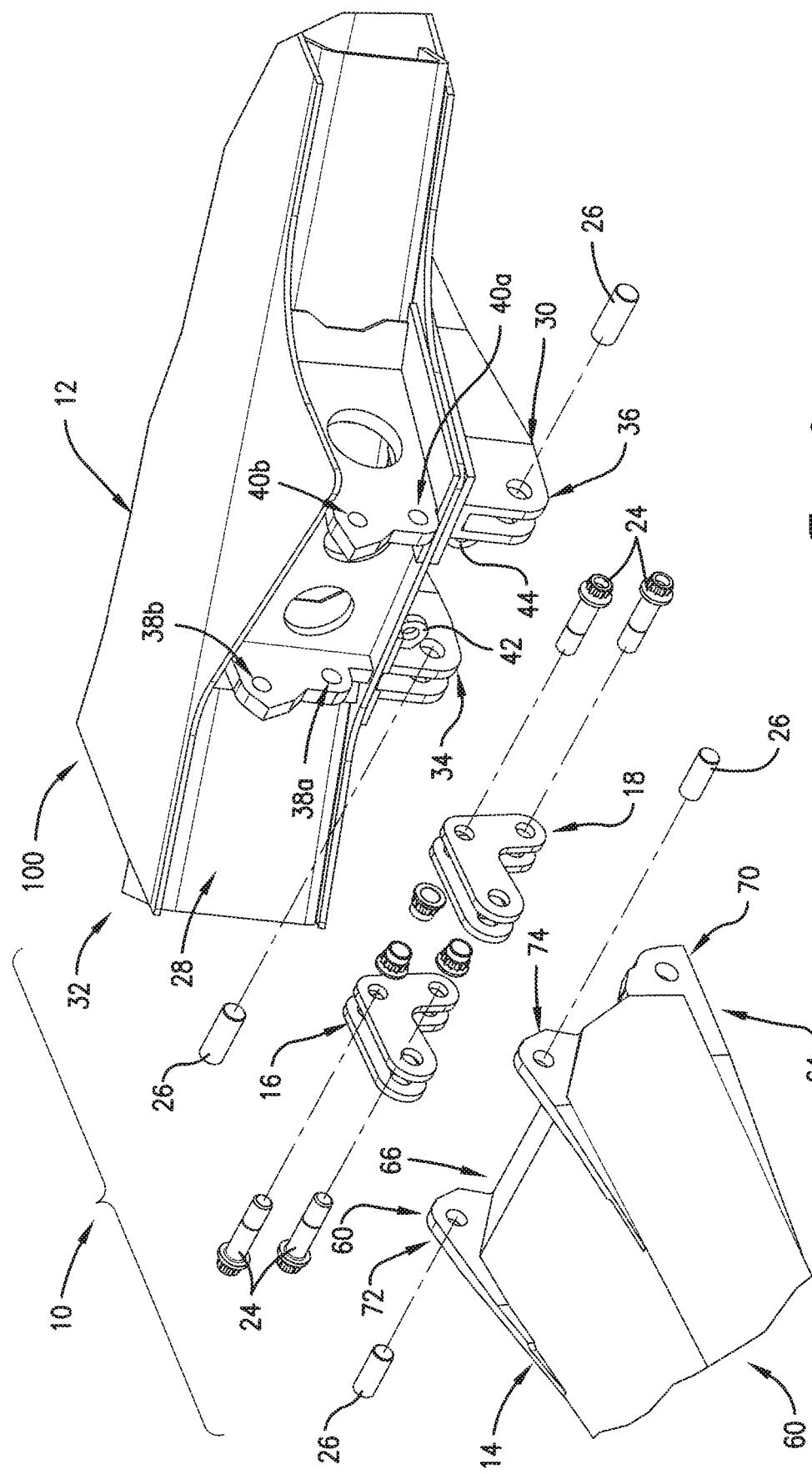
FIG. 2 is an exploded perspective view of components of the aircraft engine attachment assembly.
Figure 3:
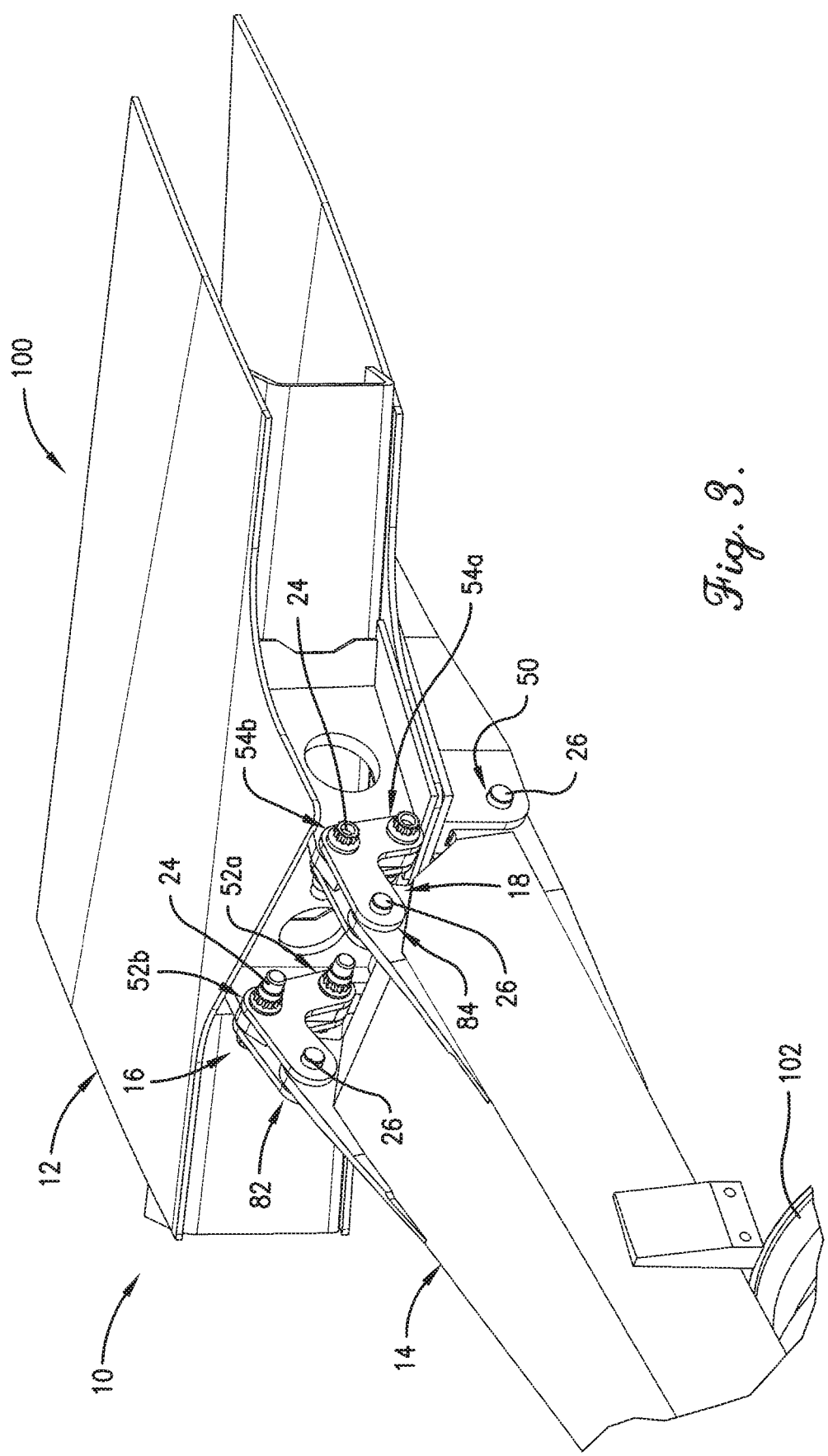
FIG. 3 is a perspective view of the aircraft engine attachment assembly.
Figure 4:
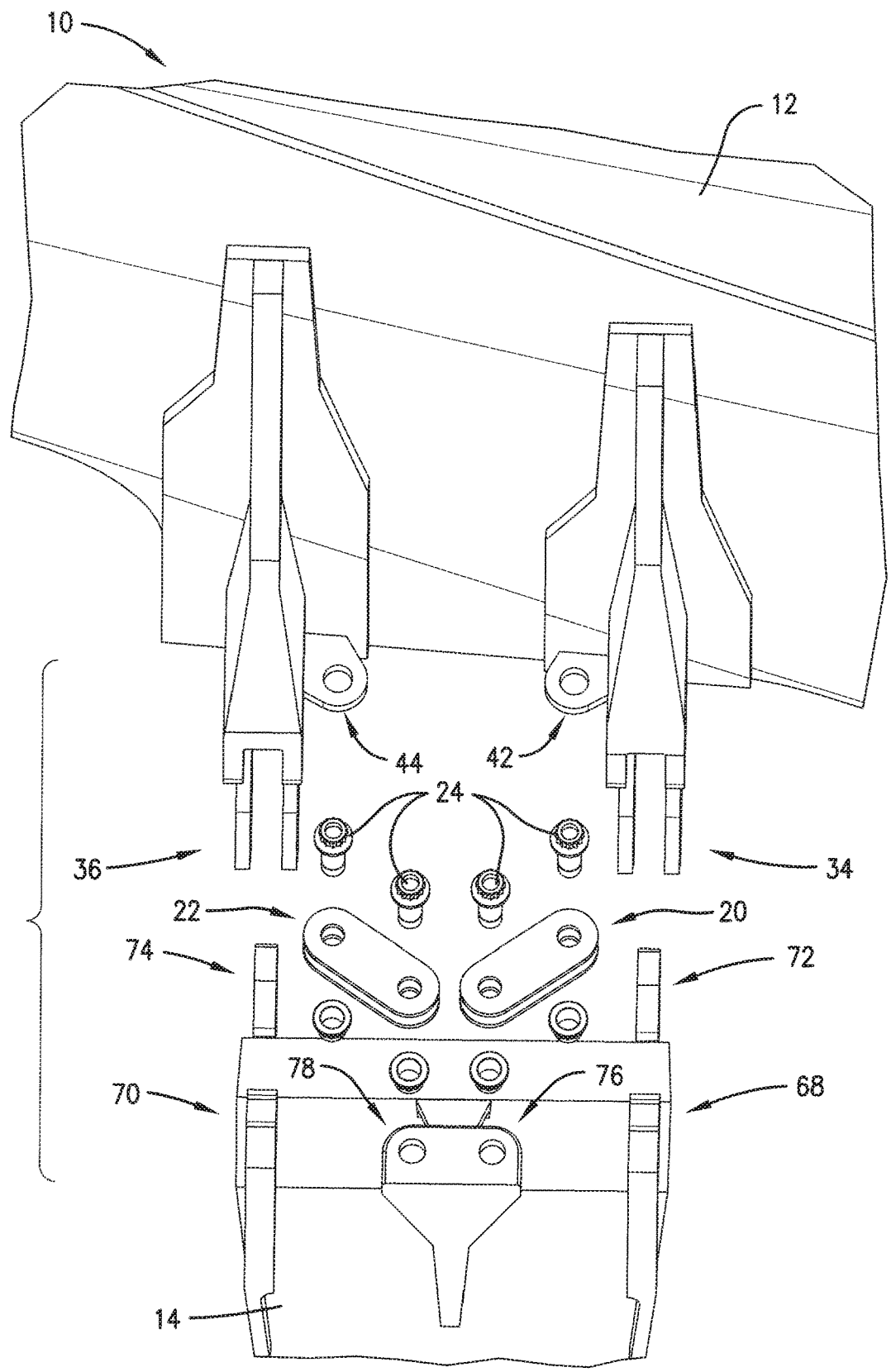
FIG. 4 is an exploded front view of components of the aircraft attachment assembly.
Figure 5:
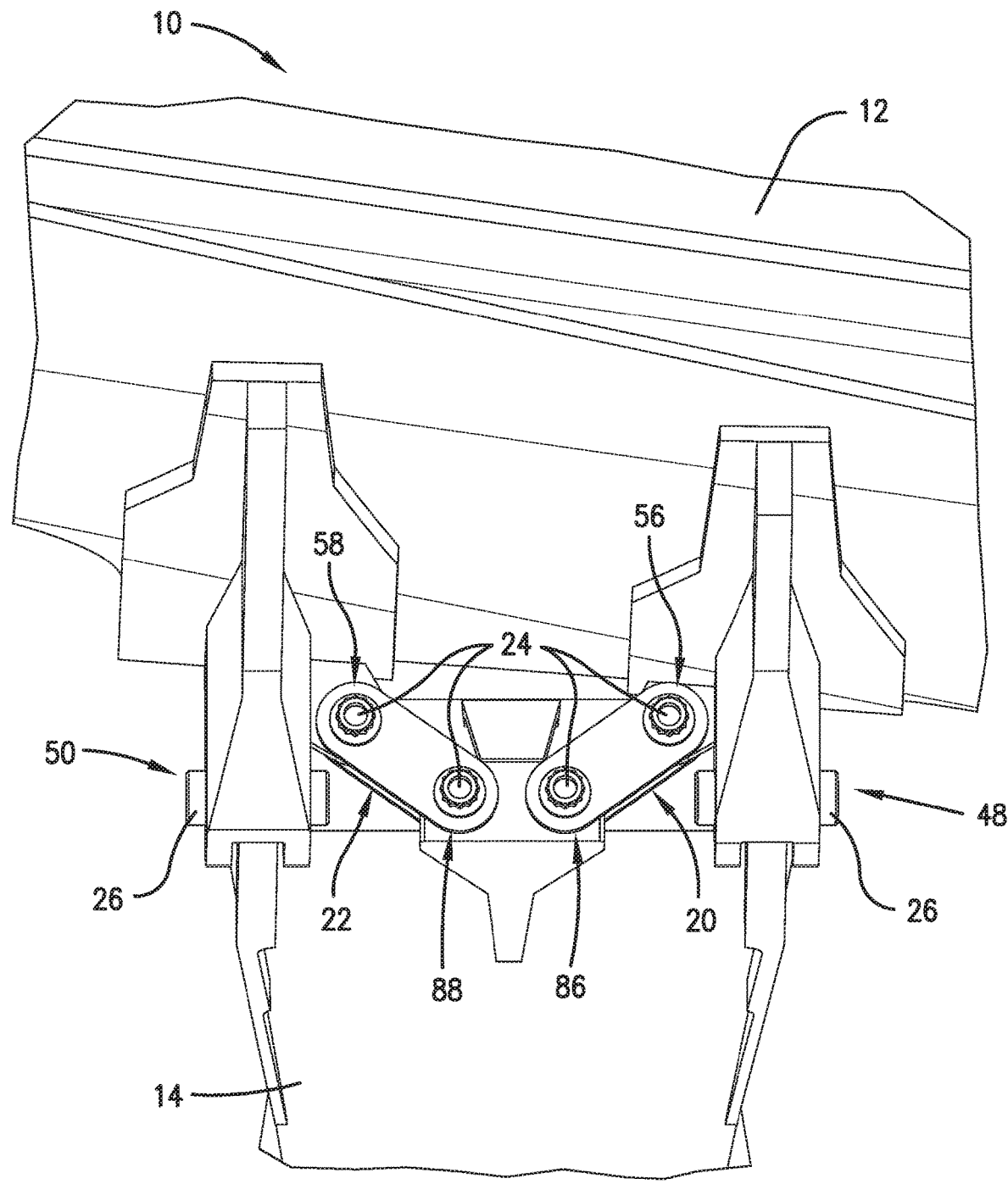
FIG. 5 is a rear plan view of components of the aircraft attachment assembly.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Turning to FIGS. 1-7b, an aircraft engine attachment assembly 10 constructed in accordance with an embodiment of the invention is illustrated. The aircraft engine attachment assembly 10 broadly comprises a wing section 12, an engine pylon 14, inboard secondary attachment links 16, outboard secondary attachment links 18, an inboard lateral load link 20, an outboard lateral load link 22, a plurality of connectors 24, and a plurality of fuse pins 26.

The wing section 12 is a portion of an aircraft wing 100 having a forward end 28 to which the engine pylon 14 is attached and a lower portion 30 and an upper portion 32. The wing section 12 comprises a lower inboard primary attachment point 34 and a lower outboard primary attachment point 36 on the lower portion 30, first and second upper inboard secondary attachment points 38a,b and first and second upper outboard secondary attachment points 40a,b on the upper portion 32, an inboard lateral load attachment point 42 and an outboard lateral load attachment point 44, and knuckle-off geometries 46a-c.

The lower inboard primary attachment point 34 and lower outboard primary attachment point 36 form lower inboard and outboard primary joints 48, 50 with primary attachment points of the engine pylon 14 (described below). The first and second inboard secondary attachment points 38a,b are spaced generally vertically from each other on the upper portion 32 of the wing section 12. The first and second upper outboard secondary attachment points 40a,b are spaced generally vertically from each other on the upper portion 32 of the wing section 12.

The first and second inboard and outboard secondary attachment points 38a,b, 40a,b form upper inboard and outboard secondary joints 52a,b, 54a,b with the inboard and outboard secondary attachment links 16a,b, 18a,b (described below). The inboard and outboard lateral load attachment points 42, 44 form inboard and outboard lateral load joints 56, 58 with the inboard and outboard lateral load links 20, 22 (described below).

The knuckle-off geometries 46a-c include upper knuckle-off geometry 46a, downside knuckle-off geometry 46b, upside knuckle-off geometry 46c. The knuckle-off geometries 46a-c may generally be on or near the forward end of the wing section 12 and are configured to engage knuckle-off geometries of the engine pylon 14 as described in more detail below. The knuckle-off geometries 46a-c may be sloped downward and aft for urging the engine 102 and engine pylon 14 under the wing section 12 as described below.

The wing section 12 may have an impact resistant structure to reduce the impact of the engine 102 and the engine pylon 14 on the wing section 12 during separation of the engine pylon 14. Alternatively, the wing section 12 may have a dry bay (no fuel area) adjacent to potential impact areas.

The engine pylon 14 may be a torque box that supports the engine 102 on the wing section 12 and includes a forward end 60 configured to be attached to the engine 102, an aft end 62 configured to be attached to the wing section 12, and opposing lower and upper portions 64, 66. The engine pylon 14 comprises a lower inboard primary attachment point 68 and a lower outboard primary attachment point 70 on the lower portion 64, an upper inboard secondary attachment point 72 and an upper outboard secondary attachment point 74 on the upper portion 66, an inboard lateral load attachment point 76 and an outboard lateral load attachment point 78, and knuckle-off geometries 80.

The lower inboard and outboard primary attachment points 68, 70 form the lower inboard and outboard primary joints 48, 50 with the lower inboard and outboard primary attachment points 34, 36 of the wing section 12. The upper inboard and outboard secondary attachment points 72, 74 form upper inboard and outboard secondary joints 82, 84 with the inboard and outboard secondary attachment links 16, 18 described below. The inboard and outboard lateral load attachment points 76, 78 form inboard and outboard lateral load joints 86, 88 with the inboard and outboard lateral load links 20, 22 described below.

The knuckle-off geometries 80a-c include upper knuckle-off geometry 80a, downside knuckle-off geometry 80b, and upside knuckle-off geometry 80c. The knuckle-off geometries 80a-c are configured to engage the knuckle-off geometries 46a-c of the wing section 12 as described in more detail below. The knuckle-off geometries 80a-c may be sloped downward and aft for urging the engine 102 and engine pylon 14 under the wing section 12 as described below.

The inboard secondary attachment links 16 connect the upper portion 66 of the engine pylon 14 to the upper portion 32 of the wing section 12 via upper inboard secondary joints 52a,b and upper inboard secondary joint 82. The inboard secondary attachment links 16 may be L-shaped and may have filleted edges to increase their strength and reduce high stress concentrations.

The outboard secondary attachment links 18 connect the upper portion 66 of the engine pylon 14 to the upper portion 32 of the wing section 12 via the upper outboard secondary joints 54a,b and upper outboard secondary joint 84. The outboard secondary attachment links 18 may be L-shaped and may have filleted edges to increase their strength and reduce high stress concentrations.

The inboard lateral load links 20 connect the engine pylon 14 to the wing section 14 via inboard lateral load joints 56, 86 and may be oriented diagonally for reacting lateral loads. The inboard lateral load links 20 may have filleted edges to increase its strength and reduce high stress concentrations.

The outboard lateral load links 22 connect the engine pylon 14 to the wing section 14 via outboard lateral load joints 58, 88 and may be oriented diagonally in an opposite direction relative to the inboard lateral load link 20 for reacting lateral loads in an opposite direction than the lateral loads reacted by the inboard lateral load link 20.

The connectors 24 secure the engine pylon 14 to the wing section 12 at non-fuse-able joints 52a,b, 54a,b 56, 58, 86, and 88 and may be solid high-strength bolts, pins, or other non-shear fasteners. The connectors 24 have a shear strength greater than a shear strength of the fuse pins 26.

The fuse pins 26 secure the engine pylon 14 to the wing section 12 at the fuse-able joints 48, 50, 82, and 84 and may be hollow, cylindrical pins configured to shear or break under a predetermined load. Alternatively, lugs or lug fittings may be used to form fuse-able or breakaway joints.

The aircraft engine attachment assembly 10 forms alternate load paths or damage tolerance load paths if any single joint 48, 50, 52a,b, 54a,b, 56, 58, 82, 84, 86, 88 fails. In normal intact operation, the engine pylon 14 is supported in both vertical and longitudinal directions at the lower inboard and outboard primary joints 48, 50 and a substantially longitudinal direction with a vertical component at the upper inboard and outboard secondary joints 82, 84. The engine pylon 14 is supported laterally via lateral load joints 86, 88.

Failure of one of the upper inboard and outboard secondary joints 52a, 54a has no effect as the resulting load path is the same as normal intact operation. That is, during normal operation, upper inboard and outboard secondary joints 52a, 54aare not loaded, which may be effected by providing a small clearance gap. Thus, the upper inboard and outboard secondary joints 52a, 54a may be configured to act as fail-safe points. Failure of one of the upper inboard and outboard secondary joints 52b, 54bresults in redistribution of loads to the adjacent upper inboard or outboard secondary joint 52a, 54a. Due to the above-mentioned clearance gap, the engine pylon 14 may move slightly, which closes the clearance gap and enables a load path to be established through the upper inboard or outboard secondary joint 52a, 54a.

Failure of one of the upper inboard and outboard secondary joints 82, 84 results in alternate load paths through the other upper inboard or outboard secondary load joint 82, 84 and the lower inboard and outboard primary joints 48, 50. Failure of one of the lower inboard and outboard primary joints 48, 50 results in alternate load paths through the opposite lower inboard or outboard primary joint 48, 50, the lateral load links 20, 22, and the inboard and outboard secondary attachment links 16, 18, which provide vertical and longitudinal support at upper inboard or outboard secondary joints 82, 84 through a resisting moment formed at upper inboard or outboard secondary joints 52a,b or 54a,b.

The aircraft engine attachment assembly 10 may also form redundant or fail-safe load paths. In this case, components may be "doubled" or "back-to-back", in which case each component is configured to carry a load if the other component fails. Use of redundant load paths may impact the effectiveness of the fuse pins 26 during fusing (described below).

Safe and predictable separation of the aircraft engine attachment assembly 10 during high energy dynamic events will now be described in more detail. Separation may occur generally in one of four scenarios: i) the aircraft has a high vertical descent rate and the engine 102 contacts the ground before the aircraft's fuselage contacts the ground; ii) the aircraft has a high vertical descent rate and the fuselage contacts the ground before the engine 102 contacts the ground; iii) the fuselage contacts the ground and the engine 102 does not contact the ground until after separation, and iv) the aircraft has a substantially forward vector and the engine 102 contacts a stationary mass on the ground.

In the first scenario, the engine pylon 14 rotates upwards about the lower inboard and outboard primary joints 48, 50 when the engine 102 contacts the ground, which causes the fuse pins 26 of the upper inboard and outboard secondary joints 82, 84 to fuse, as described in more detail below. Then, the knuckle-off geometry 46a of the wing section 12 and the knuckle-off geometry 80a of the engine pylon 14 engage so as to form a fulcrum point about which the engine pylon 14 begins rotating. This causes the fuse pins 26 of the lower inboard and outboard primary joints 48, 50 to fuse, at which point the engine pylon 14 is completely separated from the wing section 12.

In the second scenario, the engine pylon 14 rotates downwards about the lower inboard and outboard primary joints 48, 50 when the aircraft's fuselage contacts the ground, which causes the fuse pins 26 of the upper inboard and outboard secondary joints 82, 84 to fuse. The engine pylon 14 then rotates upwards about the lower inboard and outboard primary joints 48, 50 when the engine 102 contacts the ground. Then the knuckle-off geometry 46a of the wing section 12 and the knuckle-off geometry 80a of the engine pylon 14 engage so as to form a fulcrum point about which the engine pylon 14 begins rotating. This causes the lower inboard and outboard primary joints 48, 50 to fuse, at which point the engine pylon 14 is completely separated from the wing section 12. The engine 102 and engine pylon 14 may continue forward under momentum and residual thrust.

In the third scenario, the engine pylon 14 rotates downwards about the lower inboard and outboard primary joints 48, 50 when the aircraft's fuselage contacts the ground, which causes the fuse pins 26 of the upper inboard and outboard secondary joints 82, 84 to fuse. The engine pylon 14 then continues to rotate downwards about the lower inboard and outboard primary joints 48, 50. Then the knuckle-off geometry 46b of the wing section 12 and the knuckle-off geometry 80b of the engine pylon 14 engage so as to form a fulcrum point about which the engine pylon 14 begins rotating. This causes the fuse pins 26 of the lower inboard and outboard primary joints 48, 50 to fuse, at which point the engine pylon 14 is completely separated from the wing section 12. The engine 102 and engine pylon 14 may continue to travel under the wing section 12 after separation.

In the fourth scenario, the engine pylon 14 moves aft when the engine contacts the stationary mass, which causes the fuse pins 26 of the lower inboard and outboard primary joints 48, 50 and the upper inboard and outboard secondary joints 82, 84 to fuse. Then the knuckle-off geometries 46a,b,c of the wing section 12 and the knuckle-off geometries 80a,b,c of the engine pylon 14 engage each other. The knuckle-off geometries 46,a,b,c of the wing section 12 and the knuckle-off geometries 80a,b,c of the engine pylon 14 may be sloped to urge the engine pylon 14 under the and away from the wing section 12. The impact resistant structure and/or the dry bay structure of the wing section 12 may reduce any impact of the engine 102 and engine pylon 14 colliding with the wing section 12 in this scenario.

Figure 7B:
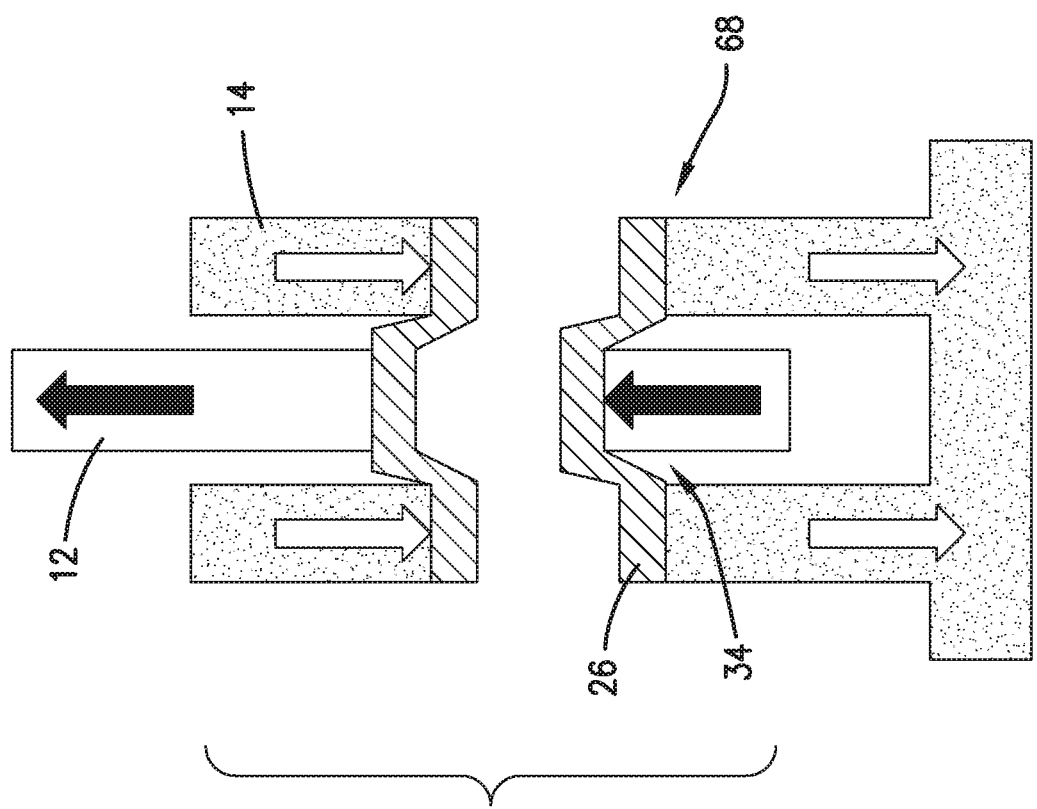
FIG. 7b is a cutaway view of the fuse pin in FIG. 7a shearing apart.
Figure 7A:
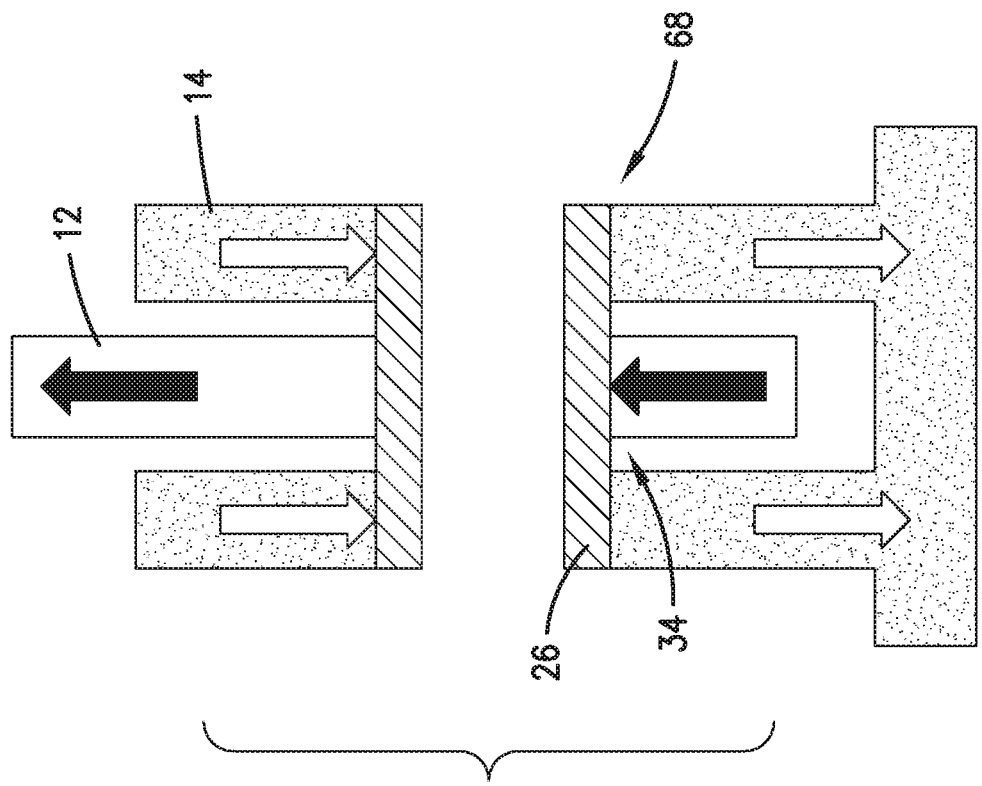
FIG. 7a is a cutaway view of a fuse-able joint including a fuse pin.

Mechanical fusing will now be described in more detail with reference to FIGS. 7a and 7b. Forces from an attachment point of a first component (e.g., lower inboard primary attachment point 34 of the wing section 12) act on a fuse pin 26 in an opposite direction as counter forces from an attachment point of another component (e.g., the lower inboard primary attachment point 68 of the engine pylon 14). This causes shearing of the fuse pin 26 at a predetermined or predictable force magnitude. Importantly, the knuckle-off geometries 46*a-c*, 80*a-c* of the wing section 12 and engine pylon 14 form fulcrum points which promotes shearing of fuse pins 26 at certain joints. Specific geometries and gaps may be used to control fusing timing and allow for thermal expansion or normal movement of the aircraft engine attachment assembly 10 without inducing fusing. In this way, the engine pylon 14 separates from the wing section 12 at desired locations and in a desired sequence, thus preserving structural integrity of fuel tanks and other important components.

The above-described aircraft engine attachment assembly 10 provides several advantage. For example, the aircraft engine attachment assembly 10 forms alternate load paths if one of its joints fails. The wing section 12 and/or engine pylon 14 include knuckle-off geometries 46*a-c*, 80*a-c* that promote mechanical fusing of joints during high energy dynamic events. The engine pylon 14 is configured to be mounted at least partially to the upper portion 30 of the wing section 12, which allows for greater engine clearance and hence larger engines to be mounted to the wing 100.

Figure 8:
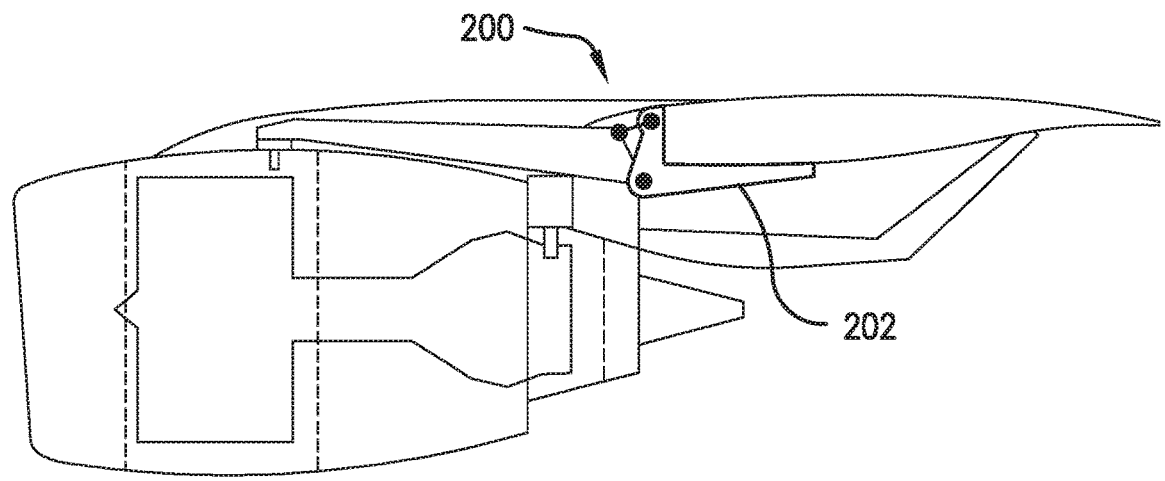
FIG. 8 is a side elevation view of an aircraft engine attachment assembly constructed in accordance with another embodiment of the invention.
Figure 9:
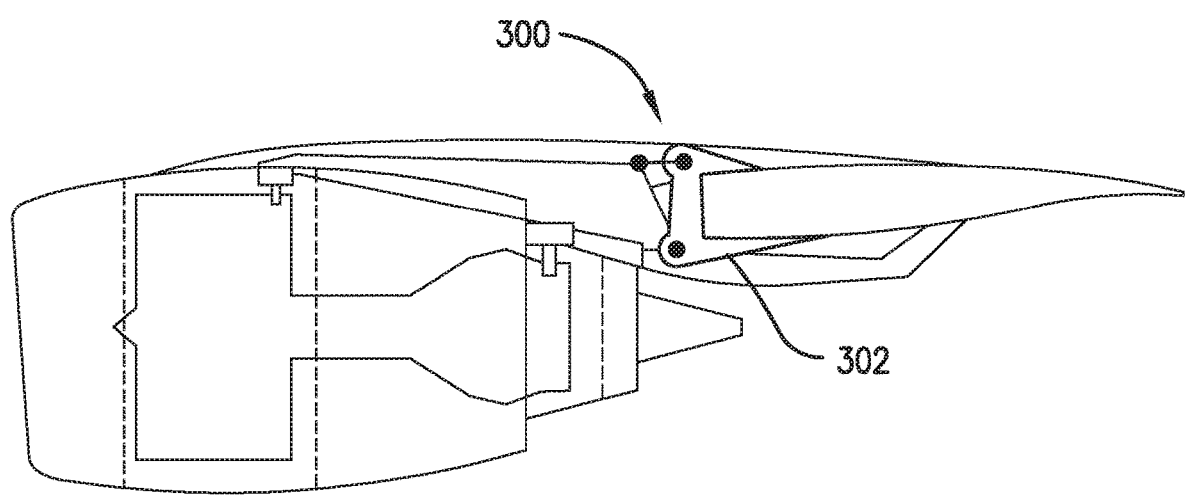
FIG. 9 is a side elevation view of an aircraft engine attachment assembly constructed in accordance with another embodiment of the invention.
Figure 10:
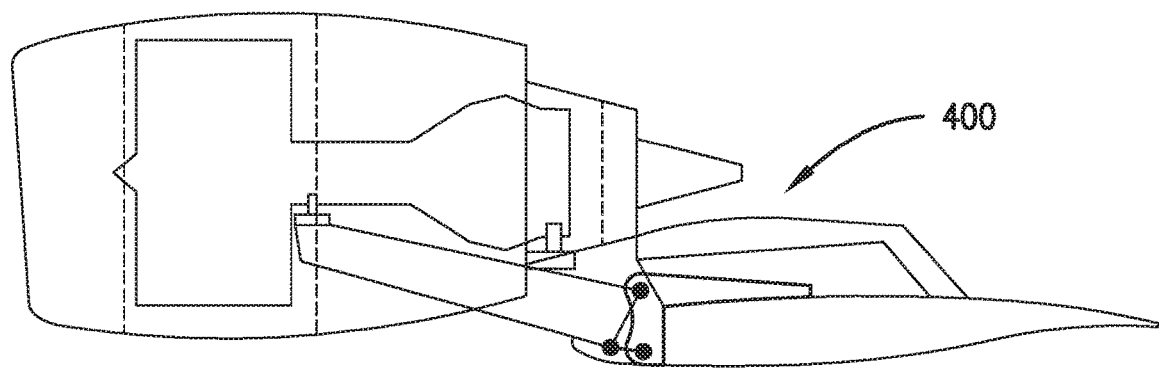
FIG. 10 is a side elevation view of an aircraft engine attachment assembly constructed in accordance with another embodiment of the invention.
Figure 11:
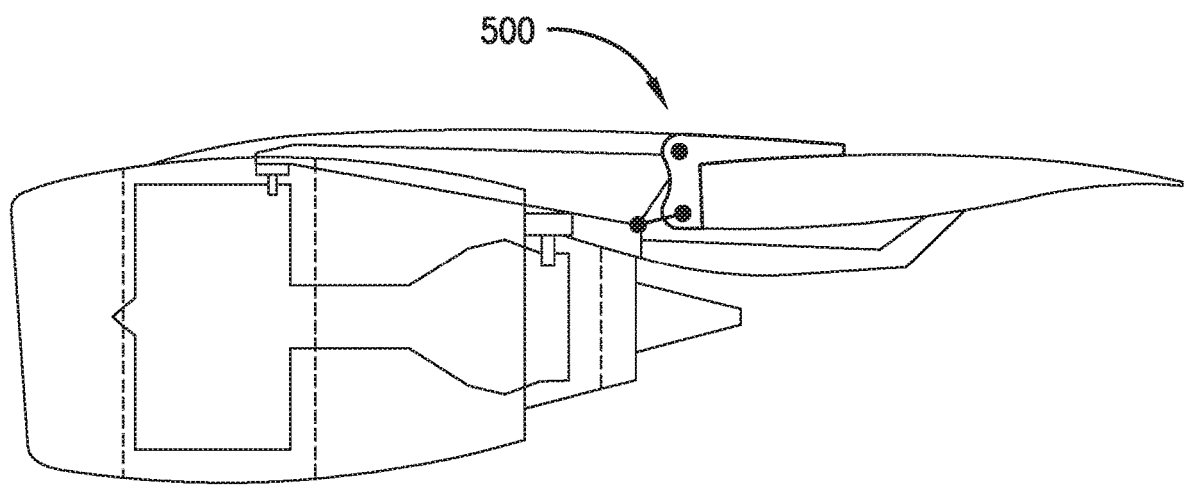
FIG. 11 is a side elevation view of an aircraft engine attachment assembly constructed in accordance with another embodiment of the invention.
Figure 12:
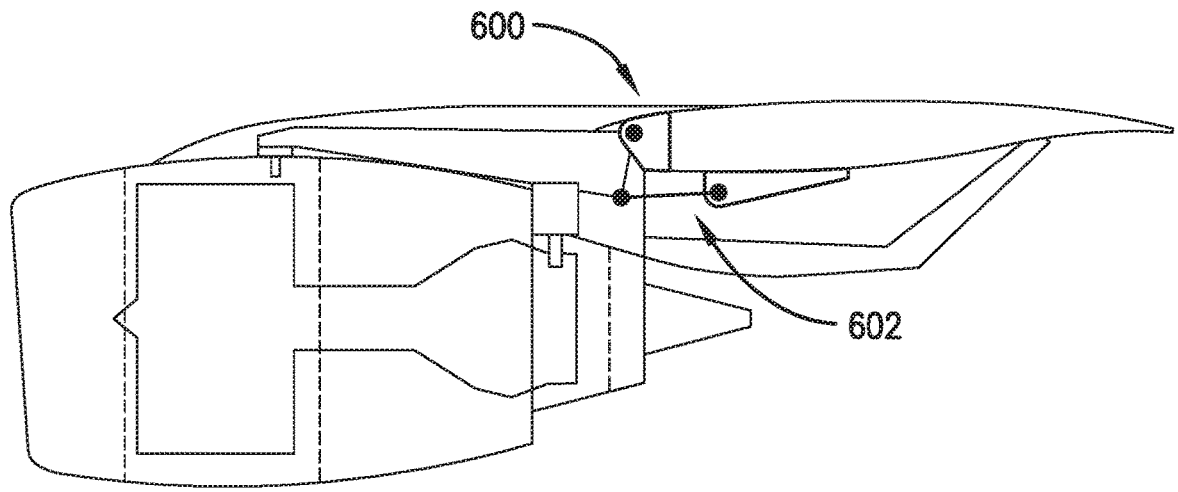
FIG. 12 is a side elevation view of an aircraft engine attachment assembly constructed in accordance with another embodiment of the invention.
Figure 13:
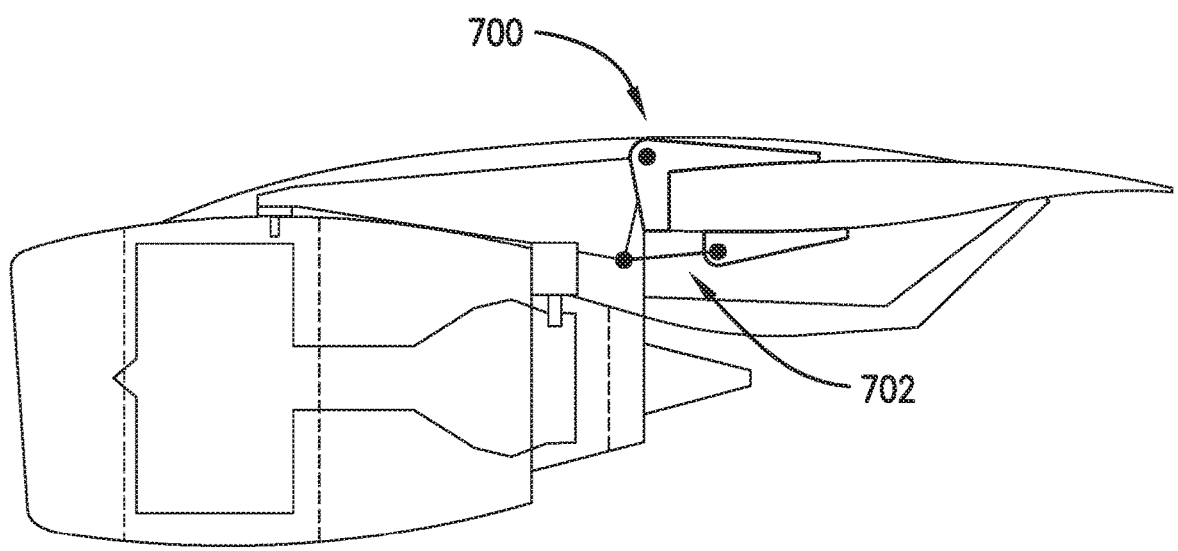
FIG. 13 is a side elevation view of an aircraft engine attachment assembly constructed in accordance with another embodiment of the invention.

Variations of the above embodiment will now be described. An aircraft engine attachment assembly 200 includes a wing mounted fitting 202 that extends up the forward end and along the underside of the wing, as shown in FIG. 8. An aircraft engine assembly 300 includes a wing mounted fitting 302 that extends up the forward end and along the top side and underside of the wing, as shown in FIG. 9. Aircraft engine assemblies 400 and 500 are similar to the above assemblies except that the primary attachment points are above the secondary attachment points, as shown in FIGS. 10 and 11. Aircraft engine assemblies 600 and 700 are similar to the above assemblies except that the secondary attachment links 602, 702 are elongated and may take the form of a single brace on each side, as shown in FIGS. 12 and 13. The aircraft engine assemblies 600 and 700 may also rely more on centerline located lateral load link alternate load paths upon failure of a primary joint.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An aircraft engine attachment assembly comprising:
  a wing section having opposing lower and upper portions, the wing section comprising:
    lower inboard and outboard primary attachment points on the lower portion; and
    upper inboard and outboard secondary attachment points on the upper portion; and
  an engine pylon having opposing forward and aft ends and opposing lower and upper portions, the forward end being configured to be attached to an engine, the engine pylon comprising:
    lower inboard and outboard primary attachment points on the lower portion of the engine pylon for attaching the engine pylon to the lower inboard and outboard primary attachment points of the wing section; and
    upper inboard and outboard secondary attachment points on the upper portion of the engine pylon for attaching the engine pylon to the upper inboard and outboard secondary attachment points of the wing section,
  the lower inboard primary attachment points of the wing section and engine pylon forming a lower inboard primary joint, the lower outboard primary attachment points of the wing section and engine pylon forming a lower outboard primary joint, the upper inboard secondary attachment points of the wing section and engine pylon forming one or more upper inboard secondary joints, and the upper outboard secondary attachment points of the wing section and engine pylon forming one or more upper outboard secondary joints, the primary joints and secondary joints being configured to form alternate load paths if one of the primary joints and secondary joints fails, wherein at least one of the secondary joints does not react loads unless at least one of the other secondary joints fails.

2. The aircraft engine attachment assembly of claim 1, wherein the aircraft engine attachment assembly is configured to form an alternate load path through the primary joints and upper inboard secondary joint if the upper outboard secondary joint fails at the upper outboard secondary attachment point of the engine pylon.

3. The aircraft engine attachment assembly of claim 1, wherein the aircraft engine attachment assembly is configured to form an alternate load path through the primary joints and upper outboard secondary joint if the upper inboard secondary joint fails at the upper inboard secondary attachment point of the engine pylon.

4. The aircraft engine attachment assembly of claim 1, wherein the at least one secondary joint that does not react loads unless at least one of the other secondary joints fails is spaced vertically below at least one of the other secondary joints.

5. The aircraft engine attachment assembly of claim 1, wherein the wing section further comprises an inboard lateral load attachment point and an outboard lateral load attachment point and the engine pylon further comprises an inboard lateral load attachment point and an outboard lateral load attachment point, the inboard lateral load attachment points of the wing section and engine pylon forming one or more inboard lateral load joint and the outboard lateral load attachment points of the wing section and engine pylon forming one or more outboard lateral load joints for reacting lateral loads between the wing section and engine pylon, the primary joints, secondary joints, and lateral load joints being configured to form alternate load paths if one of the primary joints, secondary joints, and lateral load joints fails.

6. The aircraft engine attachment assembly of claim 5, further comprising an inboard lateral load link connected to the inboard lateral load attachment points of the wing section and engine pylon and an outboard lateral load link connected to the outboard lateral load attachment points of the wing section and engine pylon.

7. The aircraft engine attachment assembly of claim 5, wherein the aircraft engine attachment assembly is configured to form an alternate load path through the secondary joints, lateral load joints, and one of the primary joints if the other primary joint fails.

8. The aircraft engine attachment assembly of claim 5, wherein at least some of the primary joints, secondary joints, and lateral load joints are configured to form redundant load paths if one of the primary joints, secondary joints, and lateral load joints fails.

9. The aircraft engine attachment assembly of claim 1, further comprising inboard secondary attachment links connected between the upper inboard secondary attachment points of the wing section and engine pylon and outboard secondary attachment links connected between the upper outboard secondary attachment points of the wing section and engine pylon.

10. The aircraft engine attachment assembly of claim 9, wherein the wing section comprises two upper inboard secondary attachment points vertically spaced from each other and two upper outboard secondary attachment points vertically spaced from each other, the inboard secondary attachment links being connected to the two upper inboard secondary attachment points of the wing section and the outboard secondary attachment links being connected to the two upper outboard secondary attachment points of the wing section.

11. The aircraft engine attachment assembly of claim 10, wherein the inboard and outboard secondary attachment links are L-shaped.

12. The aircraft engine attachment assembly of claim 9, further comprising fuse pins connecting the primary attachment points of the engine pylon to the primary attachment points of the wing section and the secondary attachment points of the engine pylon and wing section to the secondary attachment links.

13. The aircraft engine attachment assembly of claim 12, wherein the fuse pins are hollow cylindrical shear pins.

14. An aircraft engine attachment assembly comprising:
a wing section having opposing lower and upper portions, the wing section comprising:
  lower inboard and outboard primary attachment points on the lower portion;
  upper inboard and outboard secondary attachment points on the upper portion; and
  knuckle-off geometry near at least one of the primary attachment points and secondary attachment points;
an engine pylon having opposing forward and aft ends and opposing lower and upper portions, the forward end being configured to be attached to an engine, the engine pylon comprising on or near the aft end:
  lower inboard and outboard primary attachment points on the lower portion of the engine pylon for attaching the engine pylon to the lower inboard and outboard primary attachment points of the wing section;
  upper inboard and outboard secondary attachment points on the upper portion of the engine pylon for attaching the engine pylon to the upper inboard and outboard secondary attachment points of the wing section; and
  knuckle-off geometry configured to engage the knuckle-off geometry of the wing section for ensuring controlled failure of at least some of the primary attachment points and secondary attachment points of the wing section and engine pylon during severe overloading of the aircraft engine attachment assembly; and
a plurality of fuse pins for directly or indirectly connecting the engine pylon to the wing section at the primary and secondary attachment points so as to form fuse-able primary joints and fuse-able secondary joints between the engine pylon and wing section.

15. The aircraft engine attachment assembly of claim 14, wherein the knuckle-off geometry of the wing section and the knuckle-off geometry of the engine pylon include downside knuckle-off geometry near and below the primary joints, the downside knuckle-off geometry being configured to form a temporary fulcrum point below the primary joints for encouraging fusing of the fuse pins at the primary joints during severe downward overloading of the engine pylon.

16. The aircraft engine attachment assembly of claim 14, wherein the knuckle-off geometry of the wing section and the knuckle-off geometry of the engine pylon further include upside knuckle-off geometry near and above the primary joints, the knuckle-off geometry of the wing section and the knuckle-off geometry of the engine pylon being sloped to urge the engine and engine pylon under and away from the wing section during severe rearward overloading of the engine.

17. The aircraft engine attachment assembly of claim 14, wherein the knuckle-off geometry of the wing section and the knuckle-off geometry of the engine pylon include upper knuckle-off geometry near the secondary joints for encouraging fusing of the primary joints during severe upward overloading of the engine pylon.

18. An aircraft engine attachment assembly comprising:
a wing section having opposing lower and upper portions, the wing section comprising:
  lower inboard and outboard primary attachment points on the lower portion;
  upper inboard and outboard secondary attachment points on the upper portion; and
  knuckle-off geometry near at least one of the primary attachment points and secondary attachment points;
an engine pylon having opposing forward and aft ends and opposing lower and upper portions, the forward end being configured to be attached to an engine, the engine pylon comprising on or near the aft end:
  lower inboard and outboard primary attachment points on the lower portion of the engine pylon for attaching the engine pylon to the lower inboard and outboard primary attachment points of the wing section;
  upper inboard and outboard secondary attachment points on the upper portion of the engine pylon for attaching the engine pylon to the upper inboard and outboard secondary attachment points of the wing section; and
  knuckle-off geometry configured to engage the knuckle-off geometry of the wing section for ensuring controlled failure of at least some of the primary attachment points and secondary attachment points of the wing section and engine pylon during severe overloading of the aircraft engine attachment assembly,
the lower inboard primary attachment points of the wing section and engine pylon forming a lower inboard primary joint, the lower outboard primary attachment points of the wing section and engine pylon forming a lower outboard primary joint, the upper inboard secondary attachment points of the wing section and engine pylon forming one or more upper inboard secondary joints, and the upper outboard secondary attachment points of the wing section and engine pylon forming one or more upper outboard secondary joints, the primary joints and secondary joints being configured to form alternate load paths if one of the primary joints and secondary joints fails; and
a plurality of fuse pins for directly or indirectly connecting the engine pylon to the wing section at the primary and secondary attachment points so as to form fuse-able primary joints and fuse-able secondary joints between the engine pylon and wing section.

19. An aircraft engine attachment assembly comprising:
a wing section having opposing lower and upper portions, the wing section comprising:

lower inboard and outboard primary attachment points on the lower portion;

two upper inboard secondary attachment points vertically spaced from each other; and two upper outboard secondary attachment points vertically spaced from each other;

an engine pylon having opposing forward and aft ends and opposing lower and upper portions, the forward end being configured to be attached to an engine, the engine pylon comprising:

lower inboard and outboard primary attachment points on the lower portion of the engine pylon for attaching the engine pylon to the lower inboard and outboard primary attachment points of the wing section; and upper inboard and outboard secondary attachment points on the upper portion of the engine pylon for attaching the engine pylon to the upper inboard and outboard secondary attachment points of the wing section;

inboard secondary L-shaped attachment links connected between the upper inboard secondary attachment points of the wing section and engine pylon; and outboard secondary L-shaped attachment links connected between the upper outboard secondary attachment points of the wing section and engine pylon, the lower inboard primary attachment points of the wing section and engine pylon forming a lower inboard primary joint, the lower outboard primary attachment points of the wing section and engine pylon forming a lower outboard primary joint, the upper inboard secondary attachment points of the wing section and engine pylon forming one or more upper inboard secondary joints, and the upper outboard secondary attachment points of the wing section and engine pylon forming one or more upper outboard secondary joints, the primary joints and secondary joints being configured to form alternate load paths if one of the primary joints and secondary joints fails.

* * * * *